United States Patent
Tooley et al.

(10) Patent No.: US 10,240,412 B2
(45) Date of Patent: Mar. 26, 2019

(54) DRILLING FLUID PROCESSING TANK AND SYSTEM

(71) Applicant: Vermeer Manufacturing Company, Pella, IA (US)

(72) Inventors: James Brian Tooley, Harvey, IA (US); Brent Svenby, Oskalooska, IA (US)

(73) Assignee: Vermeer Manufacturing Company, Pella, IA (US)

( * ) Notice: Subject to any disclaimer, the term of this patent is extended or adjusted under 35 U.S.C. 154(b) by 567 days.

(21) Appl. No.: 14/976,487

(22) Filed: Dec. 21, 2015

(65) Prior Publication Data

US 2016/0177644 A1 Jun. 23, 2016

Related U.S. Application Data

(60) Provisional application No. 62/096,161, filed on Dec. 23, 2014.

(51) Int. Cl.
| | | |
|---|---|---|
| *B01D 21/00* | (2006.01) | |
| *B01D 29/01* | (2006.01) | |
| *B01D 29/96* | (2006.01) | |
| *B01D 33/03* | (2006.01) | |
| *E21B 21/06* | (2006.01) | |

(52) U.S. Cl.
CPC ........ *E21B 21/065* (2013.01); *B01D 21/0015* (2013.01); *B01D 29/01* (2013.01); *B01D 29/965* (2013.01); *B01D 33/0346* (2013.01)

(58) Field of Classification Search
CPC ... E21B 21/065; B01D 21/0015; B01D 29/01; B01D 29/965; B01D 33/0346
See application file for complete search history.

(56) References Cited

U.S. PATENT DOCUMENTS

| | | | |
|---|---|---|---|
| 2,936,895 | A | 5/1960 | Cusi |
| 3,804,247 | A | 4/1974 | Miscovich |
| 3,852,197 | A | 12/1974 | Thompson |
| 4,130,478 | A | 12/1978 | Swallow |
| 4,350,591 | A | 9/1982 | Lee |
| 4,360,424 | A | 11/1982 | Pearson et al. |
| 4,940,535 | A | 7/1990 | Fisher et al. |

(Continued)

FOREIGN PATENT DOCUMENTS

| | | |
|---|---|---|
| CN | 202438457 U | 9/2012 |
| CN | 202832319 U | 3/2013 |

(Continued)

OTHER PUBLICATIONS

MiSWACO, "Mongoose Pro Shaker" brochure, 2013, 12 pgs.

(Continued)

*Primary Examiner* — James C Goloboy
(74) *Attorney, Agent, or Firm* — Merchant & Gould P.C.

(57) ABSTRACT

A reclamation unit including a frame and a settling tank. The settling tank being pivotably mounted to the frame, the settling tank being pivotable between a first position and a second position. The settling tank defining at least a partially open top, the at least partially open top being configured and arranged to receive a fluid when the settling tank is in the first position. The settling tank also being configured to promote emptying of the fluid from the at least partially open top when the settling tank is pivoted into a given second position.

9 Claims, 9 Drawing Sheets

(56) References Cited

U.S. PATENT DOCUMENTS

| | | | |
|---|---|---|---|
| 4,944,868 A * | 7/1990 | Jay, Sr. | B03B 5/36 |
| | | | 134/131 |
| 5,090,498 A | 2/1992 | Hamill | |
| 5,238,117 A | 8/1993 | Hunter | |
| 5,582,727 A | 12/1996 | Foster | |
| 5,593,582 A | 1/1997 | Roff, Jr. | |
| 5,662,807 A | 9/1997 | Angelle | |
| 5,853,583 A | 12/1998 | Shah | |
| 5,921,399 A | 7/1999 | Bakula et al. | |
| 6,138,834 A | 10/2000 | Southall | |
| 6,162,284 A | 12/2000 | Mitchell | |
| 6,170,580 B1 | 1/2001 | Reddoch | |
| 6,223,906 B1 | 5/2001 | Williams | |
| 6,244,362 B1 | 6/2001 | Williams | |
| 6,250,476 B1 | 6/2001 | Kroon et al. | |
| 6,517,733 B1 | 2/2003 | Carlson | |
| 6,533,946 B2 | 3/2003 | Pullman | |
| 6,746,602 B2 | 6/2004 | Fout et al. | |
| 6,910,411 B2 | 6/2005 | Reddoch | |
| 6,976,592 B1 | 12/2005 | Svehaug | |
| 7,156,332 B2 | 1/2007 | Rees | |
| 7,232,525 B2 | 6/2007 | Eriksen | |
| 7,278,540 B2 | 10/2007 | Stone et al. | |
| 7,380,673 B2 | 6/2008 | Fout et al. | |
| 7,520,391 B2 | 4/2009 | Schulte, Jr. et al. | |
| 7,568,535 B2 | 8/2009 | Larson et al. | |
| 7,731,037 B2 | 6/2010 | Frazier et al. | |
| 7,909,170 B2 | 3/2011 | Jones et al. | |
| 8,137,550 B1 | 3/2012 | Moe | |
| 8,312,995 B2 | 11/2012 | Dufilho et al. | |
| 8,316,963 B2 | 11/2012 | Eia et al. | |
| 8,551,345 B2 | 10/2013 | Brown et al. | |
| 8,561,805 B2 * | 10/2013 | Scott | B01D 33/0315 |
| | | | 209/555 |
| 8,844,650 B2 | 9/2014 | Saiz | |
| 9,023,275 B2 | 5/2015 | McClung, III | |
| 2006/0113220 A1 | 6/2006 | Scott et al. | |
| 2007/0163927 A1 | 7/2007 | Eia | |
| 2008/0236822 A1 | 10/2008 | Reeves et al. | |
| 2009/0134102 A1 * | 5/2009 | Cousins | B01D 21/0051 |
| | | | 210/803 |
| 2011/0011777 A1 | 1/2011 | Trussell et al. | |
| 2013/0043031 A1 | 2/2013 | Tunget | |
| 2013/0092637 A1 | 4/2013 | Pomerleau | |

FOREIGN PATENT DOCUMENTS

| | | |
|---|---|---|
| GB | 791520 | 3/1958 |
| GB | 2455252 B | 9/2011 |
| WO | WO 2005/054623 | 6/2005 |
| WO | WO 2008/042646 | 4/2008 |
| WO | WO 2010/048718 | 5/2010 |
| WO | WO 2013/011265 | 1/2013 |

OTHER PUBLICATIONS

MiSWACO, "BEM-650 Shaker: Balanced elliptical motion for better solids removal and fluid recovery with less screen wear," 2005, 8 pgs.

GN-Solids Control Equipments Company, "Horizontal Directional drilling mud recycle equipments," 2009, 2 pgs.

"Maxi Drilling Rig—250 tonnes of Thrust and Pull Back," AMS No-Dig, 2010, 2 pgs.

"P-600 Operation & Safety Instruction Manual," American Augers, 2011, 74 pgs.

GN Solids Control, "How to Recycle Drilling Mud/fluids," PRLOG, 2011, 2 pgs.

* cited by examiner

DRILLING FLUID PROCESSING TANK AND SYSTEM

CROSS REFERENCE TO RELATED APPLICATION

The present patent application claims the benefit of U.S. Provisional Patent Application Ser. No. 62/096,161, filed Dec. 23, 2014, which patent application is hereby incorporated by reference in its entirety.

BACKGROUND

Drilling fluid serves multiple purposes in drilling operations, specifically horizontal drilling processes and oilfield drilling processes. For example, the drilling fluid acts as a lubricant to cool rotary drill bits and facilitate faster cutting rates, along with helping to maintain borehole integrity. In some applications, the drilling fluid can provide hydraulic horsepower for mud motors that help to bore through hard soils.

As the drill bit pulverizes the dirt or rock at the end of a borehole, small pieces of solid material are left behind. The drilling fluid mixes with these cuttings to form a liquid/solid slurry. The slurry, or used drilling fluid, is routed from the drilling process to a processing system at which the cuttings particulates are removed from the drilling fluid. Removing the cuttings particulates allows the drilling fluid to be reused. Furthermore, reusing the drilling fluid reduces disposal costs associated with the drilling process.

Conventional processing systems generally include several components such as a clean drilling fluid tank, a used drilling fluid box, and a shaker having a shaker screen. The shaker is configured to perform a removal and separation of solid constituents of the slurry. The used drilling fluid box, or settling tank (also sometimes known as a "mud box"), is configured to help filter the used drilling fluid and to deposit the used drilling fluid onto the shaker screen. A typical shaker screen extends across a bed. The bed is vibrated (or otherwise moved) as the material to be separated is introduced onto the screen, which moves the relatively large size material along the screen. The liquid and/or relatively small sized material passes through the screen into the bed.

SUMMARY

Due to the particles and other debris in used drilling fluid, certain components of the drilling fluid processing system require regular cleaning and maintenance. This is especially true for the used drilling fluid box. Therefore, there is an ongoing need for a box design that can be cleaned with minimal effort. In addition, there is also an ongoing need for a used drilling fluid box design that maintains a more uniform flow of drilling fluid from the used drilling fluid box.

In a first aspect of the present disclosure, a drilling fluid reclamation unit is disclosed. The drilling fluid reclamation unit includes a filtering screen. The drilling fluid reclamation unit also includes a settling tank pivotally mounted proximate to the filtering screen. The settling tank includes a used fluid inlet that defines an open top and a used fluid outlet. The used fluid outlet is positioned at a side surface of the settling tank. The settling tank is pivotable between a first position and a second position. When in the first position, the settling tank is configured to receive a fluid via the used fluid inlet and expel the fluid via the used fluid outlet onto the filtering screen. When in the second position, the settling tank is configured to empty the contents of the settling tank at the used fluid inlet.

In a second aspect of the present disclosure, a reclamation unit is disclosed. The reclamation unit includes a frame. The reclamation unit also includes a settling tank pivotably mounted to the frame. The settling tank is pivotable between a first position and a second position. The settling tank defines at least a partially open top and the at least partially open top is configured and arranged to receive a fluid when the settling tank is in the first position. The settling tank is also configured to promote emptying of the fluid from the at least partially open top when the settling tank is pivoted into a given second position.

In a third aspect of the present disclosure, a reclamation unit is disclosed. The reclamation unit includes a frame. The reclamation unit also includes a shaker. The shaker includes a screen mounted relative to the frame and a used fluid port. The reclamation unit also includes a settling tank mounted relative to the frame. The settling tank defines an open top. The open top is positioned below the used fluid port. The open top is configured to receive a fluid flow from the used fluid port and the settling tank is aligned substantially over the screen.

In a fourth aspect of the present disclosure, a reclamation unit is disclosed. The reclamation unit includes a frame. The reclamation unit also includes a shaker. The shaker includes a screen mounted relative to the frame and a used fluid port. The reclamation unit also includes a settling tank mounted relative to the frame. The settling tank defines an open top. The open top is positioned below the used fluid port. The open top is configured to receive a fluid flow from the used fluid port. The settling tank further defines an exit weir. The exit weir defines a first fluid outflow location for the settling tank. The exit weir has a movable flapper valve associated therewith, and the movable flapper valve extends over an end of the exit weir. The movable flapper valve is configured to regulate a fluid outflow proceeding from the exit weir. The screen is arranged to receive the fluid outflow from the exit weir.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

While oilfield drilling is typically conducted in a generally vertical orientation, horizontal directional drilling (HDD) is a commonly used technique for the installation of underground utilities positioned along a generally horizontal path. However, in both oilfield drilling and HDD, drilling fluid is commonly used during the drilling process. As clean drilling fluid is introduced to the drilling process, specifically the drilling pit, the drilling fluid becomes filled with particulates and cuttings from the drilling process, thereby becoming used drilling fluid and requiring removal from the drilling pit. In order to prevent waste, and pollution of the worksite, the used drilling fluid is removed, processed and cleaned, and pumped back to the drilling process in clean form. This processing and cleaning can be done at a separate machine, commonly referred to as a reclaimer. As the reclaimer removes particulates and cuttings from the used drilling fluid, a buildup of removed debris and particulates can occur in certain components of the reclaimer, thereby necessitating cleaning. Often, cleaning components of the reclaimer is difficult due to tight spaces and the amount of plumbing that exists as part of the reclaimer. Therefore, systems improving the ability to clean reclaimer components are desired.

Figure 1:
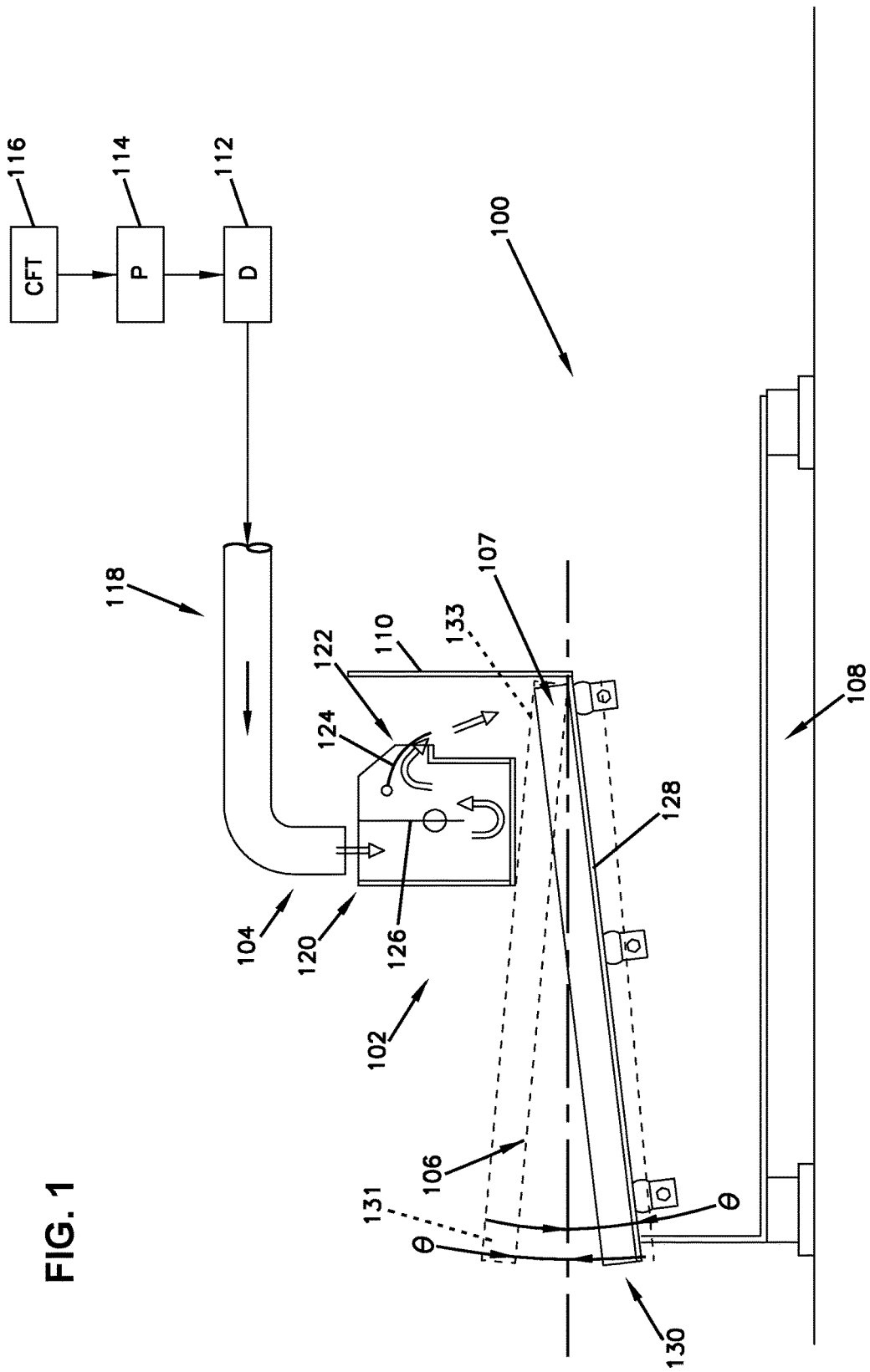
FIG. 1 is a schematic view of an example drilling system and drilling fluid processing system, according to one embodiment of the present disclosure.

FIG. 1 is a schematic of a drilling system and a drilling fluid processing system. The drilling fluid processing system 100 includes a settling tank 102, a used fluid port 104, a screen 106, a bed 108 and, in some embodiments, a splash guard 110. The drilling fluid processing system 100 is configured to receive used drilling fluid from drilling arrangement 112. The drilling arrangement 112 may receive clean drilling fluid from a pump 114 which pumps clean drilling fluid from a clean drilling fluid tank 116. In some embodiments, the drilling arrangement 112 may receive clean drilling fluid from a plurality of pumps.

In some embodiments, the drilling arrangement 112 includes a drill head coupled to one end of a drill string. The drill string includes one or more piping segments that are connected (e.g., threadably connected) end-to-end. During active drilling, the drill head cuts into and progresses through the ground. As the drill head progresses, additional piping segments are added to the drill string. In certain examples, active drilling pauses while the additional piping segments are added. On occasion, the drill head is replaced (or other maintenance is performed) during which active drilling is paused.

The pump arrangement 114 supplies clean drilling fluid to the drilling arrangement 112 during active drilling. At the drilling arrangement 112, the clean drilling fluid is used to lubricate the drilling arrangement 112 and/or to carry away cuttings (i.e., solids) made by the drilling arrangement 112, thus ultimately resulting in the used drilling fluid that is handled by the present drilling fluid processing system 100. A flow line 118 carries the used drilling fluid including the cuttings from the drilling arrangement 112 to the drilling fluid processing system 100. For example, the used drilling fluid can enter a flow line 118 at the drilling arrangement 112 and exit the flow line 118 at the used fluid port 104 at the processing system 100.

The drilling fluid processing system 100 is configured to remove at least some of the solid particulate/cuttings from the used drilling fluid. In some embodiments, the settling tank 102 is one of many filtering apparatus in the drilling fluid processing system 100. For example, in certain embodiments, multiple settling tanks 102 can be included in the drilling fluid processing system 100. The used drilling fluids can be pumped to the various settling tanks 102 for processing. In certain embodiments, each of the settling tanks 102 has a corresponding cleaned drilling fluid tank. In other implementations, two or more of the settling tanks 102 output to a shared cleaned drilling fluid tank.

In some embodiments, the drilling fluid processing system 100 also includes other processing units that pre-process or post-process the used drilling fluids. For example, the drilling fluid processing system 100 may have one or more first-stage processing units, one or more second-stage processing units, and one or more third-stage processing units. In other implementations, the drilling fluid processing system 100 may have a greater or lesser number of processing unit stages. Each stage processing unit may have a corresponding cleaned drilling fluid tank. In certain implementations, used drilling fluid can be pumped from the drill to the first-stage processing unit; processed drilling fluid output from the first-stage processing unit can be input to the second-stage processing unit (e.g., via a first cleaned drilling fluid tank); processed drilling fluid output from the second-stage processing unit can be input to the third-stage processing unit (e.g., via a second cleaned drilling fluid tank); and processed drilling fluid output from the third-stage processing unit can be output to a third cleaned drilling fluid tank.

As depicted in FIG. 1, a cross-section of the settling tank 102 is shown. The settling tank 102 includes a used fluid inlet 120 and a used fluid outlet 122. The used fluid inlet 120 defines an open top of the settling tank 102, and the used fluid inlet 120 is adapted to receive a flow of fluid from the used fluid port 104. In some embodiments, there is an air gap between the used fluid port 104 and the used fluid inlet 120 of the settling tank 102.

Used drilling fluid flows through the flow line 118 from the drilling arrangement 112 to the used fluid port 104, enters the settling tank 102 at the used fluid inlet 120 and exits the settling tank 102 at the used fluid outlet 122. The used fluid outlet 122 directs the used drilling fluid to the screen 106.

In some embodiments, the used fluid outlet 122 is an exit weir that is configured and arranged to promote a flow of fluid out of the settling tank 102. In some embodiments, the used fluid outlet 122 has a flow regulator 124 mounted proximate the used fluid outlet 122. The flow regulator 124 is configured to regulate the flow of fluid that is proceeding out of the used fluid outlet 122 of the settling tank 102. As depicted, the flow regulator 124 can be hingedly mounted and allowed to float between a more open flow and a less open flow, the flow being dependent on the fluid flow traveling through the settling tank. This flow regulator 124 also allows for consistent flow out of the used fluid outlet 122 regardless of how much debris and particulates are built up in the settling tank 102. In some embodiments, the flow regulator 124 can be configured to behave like a movable flapper valve.

The settling tank 102 also includes an internal divider 126 disposed therein. The internal divider 126 can be configured to cause fluid within the settling tank 102 to travel in a certain path when in the settling tank 102. Specifically, by vertically orientating the internal divider 126 within the settling tank 102, the fluid flow must traverse two turns prior to leaving the settling tank 102 via the used fluid outlet 122. By forcing the fluid to turn, the velocity of the fluid slows at the turns and causes particles and debris carried by the fluid to settle toward the bottom of the settling tank 102. This allows for an initial filtering of the used drilling fluid before the used drilling fluid reaches the screen 106. However, over time the settling tank must be cleaned due to the debris and particles settling to the bottom. Therefore, in some embodiments, the settling tank 102 is rotatable between a first position and a second position to facilitate cleaning (as shown and further described with respect to FIG. 4).

As shown, the settling tank 102 is positioned over the screen 106. In the depicted embodiment, the settling tank 102 is manufactured with an open top, so sealing the settling tank 102 is not critical. Therefore, if any leaks arise in the settling tank 102, because the settling tank 102 is positioned over the screen 106, leaked fluid drops only onto the screen 106. In some embodiments, the settling tank 102 may be mounted to a frame that is configured to suspend the settling tank 102 at least partially over the screen 106.

As used fluid exits the used fluid outlet 122 of the settling tank 102, the used fluid falls, by gravity, onto the screen 106. In some embodiments, a splash guard 110 is used to contain any excess fluid that either bounces off of the screen 106 or is expelled at too high of a rate from the used fluid outlet 122.

In certain embodiments, the screen 106 extends over an intermediate structure (e.g., a bed) 108. The screen 106 is sized and configured to catch solids in the used drilling fluid while allowing drilling fluid to pass through the screen 106. A first outlet 128 is defined along the length of the screen 106 and the second outlet 130 is defined at the opposite end of the screen 106 from where the used fluid is first deposited. The first outlet 128 allows for fluid to pass through the screen 106 and the second outlet allows for solids caught by the screen 106 to fall off the screen to a waste pile.

The screen 106 can be generally sloped to facilitate the movement of particles across the screen 106. In the depicted embodiment, the settling tank 102 is configured to deposit used fluid via the used fluid outlet 122 near the highest point 107 on the screen 106. Further, the settling tank 102 is configured to deposit used fluid in a horizontal direction that is generally opposite of the horizontal slope of the screen 106. By doing this, used fluid is prevented from quickly washing across the screen 106, which would minimize the filtering effect of the screen 106. Additionally, by depositing fluid opposite of the slope of the screen 106 it prevents the accidental overshot of the screen 106 by the fluid in the instance that fluid flow is too high coming from the used fluid outlet 122. By using the entire screen area, the used fluid is on the screen 106 for a longer time, which increases the opportunity for drying of the debris and particles caught by the screen 106 before being discharged off the screen 106 at the second outlet 130. Accordingly, this can increase the throughput capacity of the screening system.

In other embodiments, the screen 106 can be sloped so that a screen end 131 near the second outlet 130 is higher than a screen end 133 where fluid is deposited via the used fluid outlet 122. Such an embodiment is shown in dashed lines in FIG. 1. When angled upwardly near the second outlet 130, fluid flow across the screen 106 is slowed, thereby allowing the screen 106 more time to properly filter the fluid. In some embodiments, the screen 106 has an angle $\theta$ with the horizontal. The angle $\theta$ of the screen 106 can be any of a range of angles including slightly upwardly or downwardly inclined relative to the second outlet 130. In some embodiments, the angle $\theta$ can be between about 0 and about 10 degrees from horizontal.

In certain embodiments, the bed 108 and/or the screen 106 vibrates or shakes to facilitate movement of the solids across the screen 106. In some embodiments, the separated drilling fluid is routed from the bed 108 back to the cleaned drilling fluid tank 116. In certain embodiments, the separated drilling fluid undergoes additional processing (e.g., filtering) before reaching the cleaned drilling fluid tank 116.

In some embodiments, the bed 108 is disposed above the clean drilling fluid tank 116. For example, in certain embodiments, the bed 108 mounts to a top surface of the cleaned drilling fluid tank 116. In certain embodiments, the bed 108 is disposed on a platform extending across the top of the clean drilling fluid tank 116. In certain embodiments, the top surface is defined by a platform that extends over the clean drilling fluid tank 116. The platform may form a walkway for a user to access components of the drilling fluid processing system 100 (e.g., for maintenance, operation, etc.).

Figure 2:
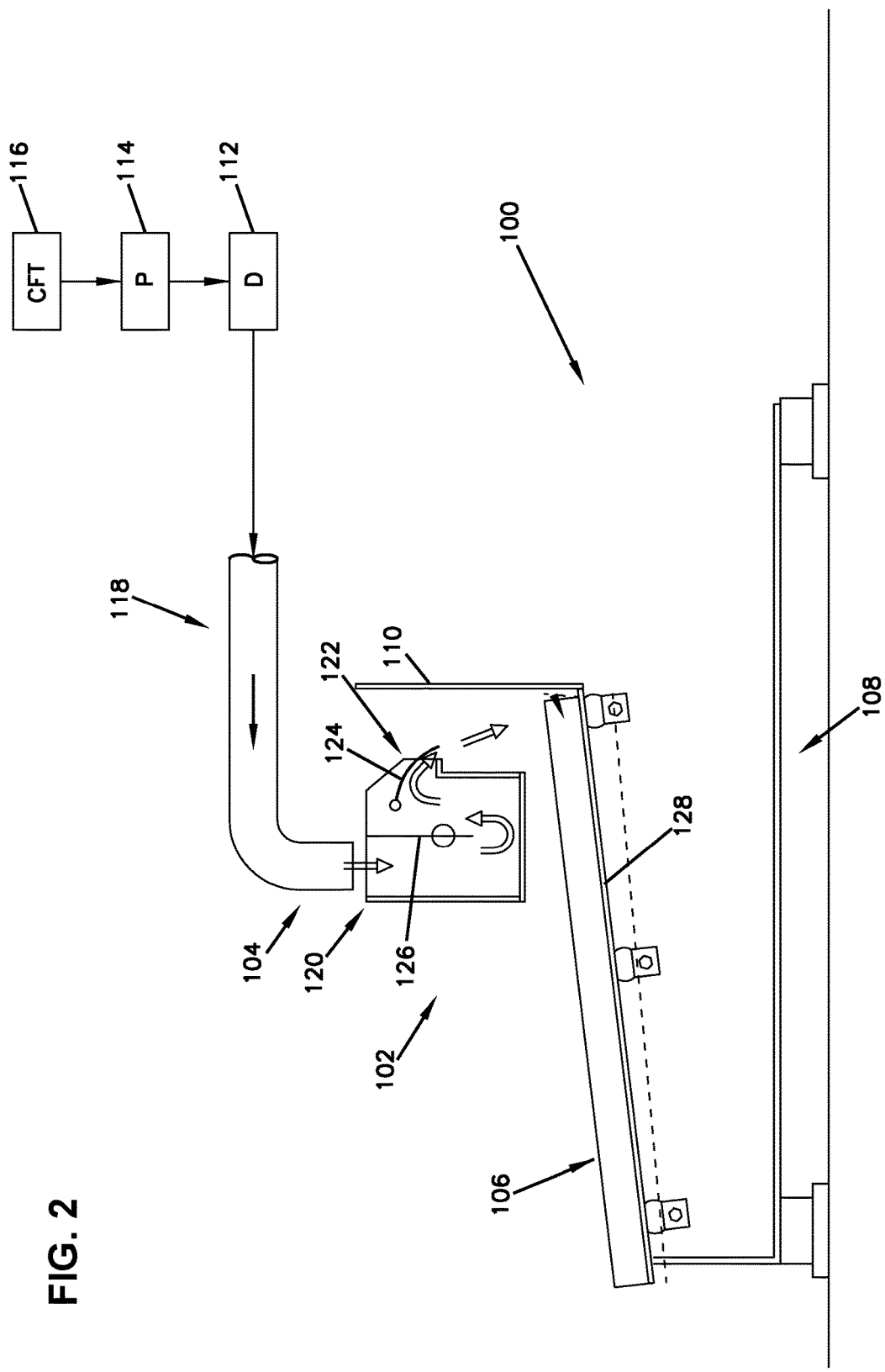
FIG. 2 is a schematic view of the example drilling system and the drilling fluid processing system of FIG. 1.

FIG. 2 is a schematic showing the drilling fluid processing system 100. FIG. 2 shows an instance where there is a high fluid flow rate within the settling tank 102. The used fluid outlet 122 is shown allowing a higher rate of fluid proceeding from the used fluid outlet 122 when compared to the flow rate in FIG. 1. In addition, the flow regulator 124 is shown to be positioned so as to allow more fluid flow out of the used fluid outlet 122. In the depicted embodiment, the flow regulator 124 is rigid. When there is no fluid flow out of the used fluid outlet 122, the flow regulator 124 rests in a closed position, a position that covers the used fluid outlet 122. In other embodiments, the flow regulator 124 may be hinged but lockable in certain positions about the hinge. The purpose of the flow regulator 124 is to act as a dam which slightly backs up the fluid (i.e., slowing outflow) in the settling tank 102 which, in turn, helps to distribute the fluid evenly across the width of the used fluid outlet 122 and therefore on the screen 106. The flow regulator 124 can help to reduce the turbulence of the fluid flow at the used fluid outlet 122, improving the consistent distribution of fluid flow across screen 106. The flow regulator 124 can also be configured so that the used fluid being expelled from the used fluid outlet 122 discharges onto the screen 106 in a consistent/controlled location.

Figure 3:
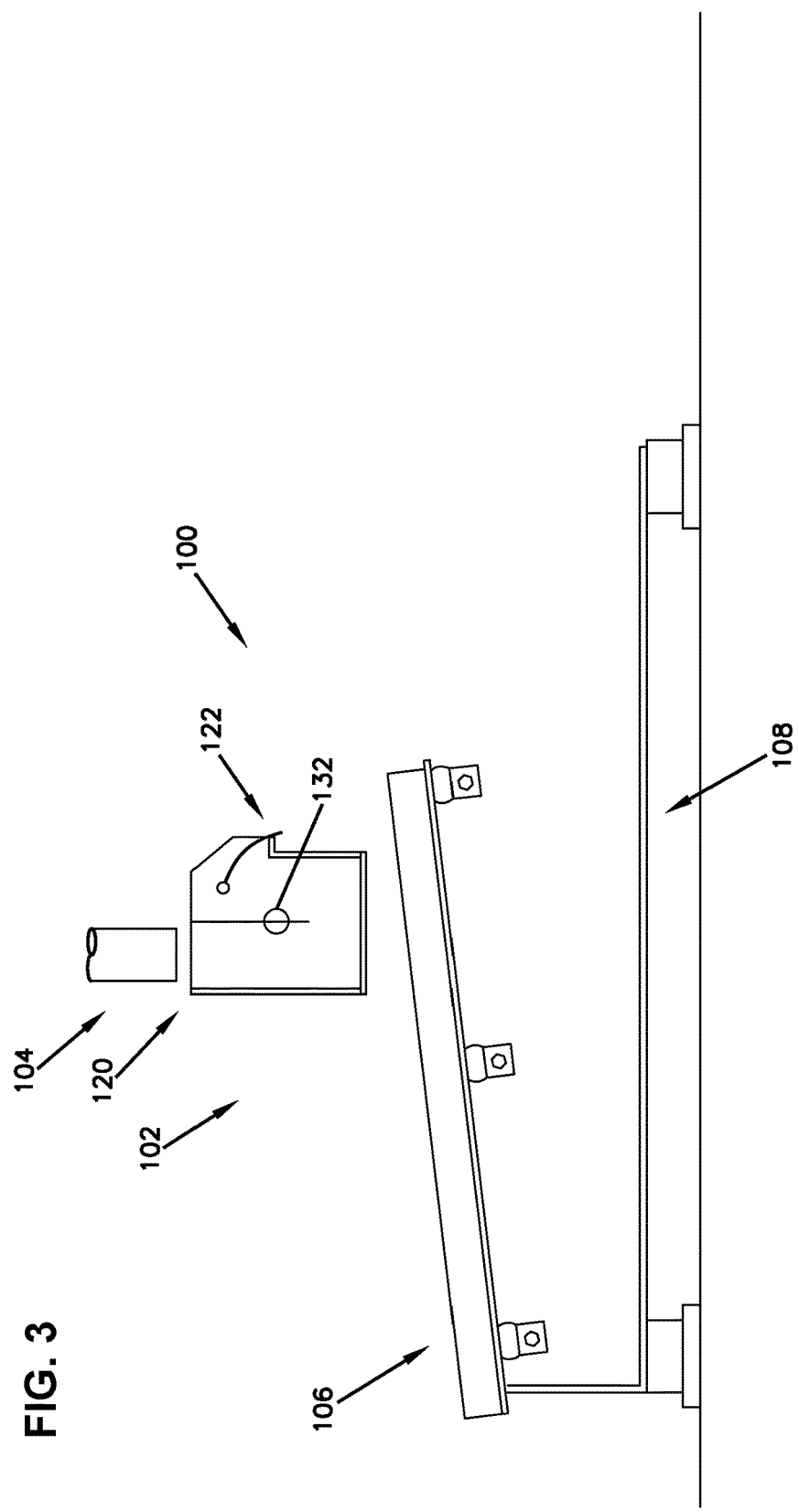
FIG. 3 is a schematic view of an example drilling fluid processing system as shown in FIG. 1.
Figure 4:
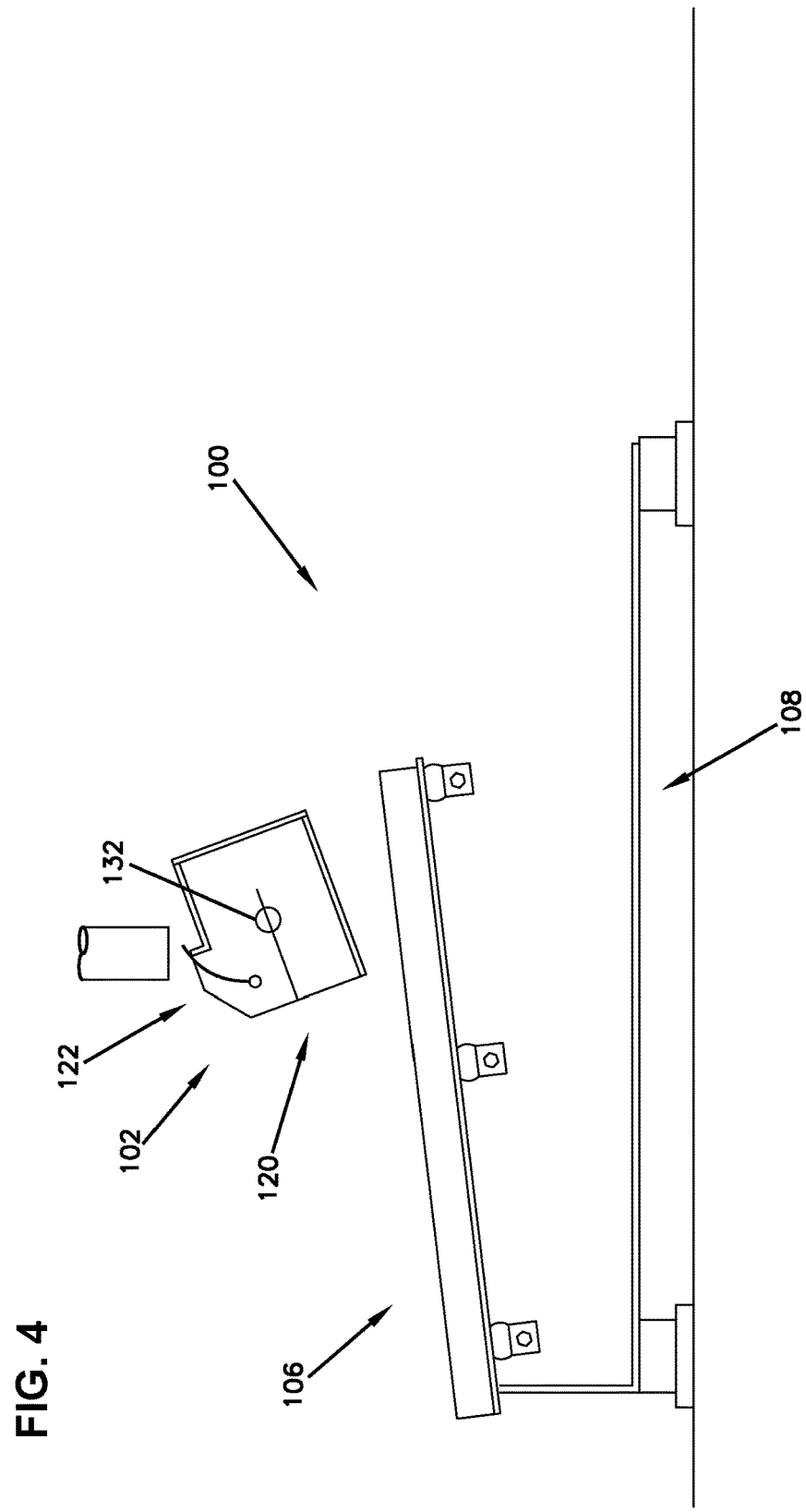
FIG. 4 is a schematic view of the example drilling fluid processing system as shown in FIG. 1.

FIGS. 3 and 4 show the settling tank 102 in a first position and second position respectfully. In the first position, also shown in FIGS. 1-2, the settling tank 102 is configured so as to receive used drilling fluid at the settling tank's used fluid inlet 120 and expel the fluid at the used fluid outlet 122. However, in the second position, as shown in FIG. 4, the settling tank 102 is configured to expel its contents via the used fluid inlet 120. The second position can be used for maintenance or cleaning.

The settling tank 102 can be rotatable about a pivot point 132. In some embodiments, the settling tank 102 can be mounted to a frame via a pivotable mount that connects the frame and the settling tank 102. In still other embodiments, the settling tank 102 can include a handle attached thereto to facilitate rotating (shown in FIG. 6). In still other embodiments, the settling tank 102 can be configured so as to be lockable in either the first or second position.

In the depicted embodiment, the settling tank 102 is rotatable in a particular direction so the contents of the settling tank 102 are expelled onto the screen 106. Specifically, when in the second position, the used fluid inlet 120 faces in a horizontal direction that is the same as the downward horizontal slope of the screen 106. Additionally, the settling tank 102 is proximately positioned to the screen 106, so that any contents expelled from the settling tank 102 do not fall a great distance from the settling tank 102 to the screen 106. This positioning of the settling tank 102 is advantageous in the case that there are large solids within the settling tank 102 prior to emptying of the settling tank 102.

By having a rotatable settling tank 102, the user has two options when the time comes to clean the settling tank 102. First, because the settling tank 102 has an open top, the user can leave the settling tank 102 in the first position and clean out the settling tank 102 by accessing the inside of the settling tank 102 through the used fluid inlet 120. This cleaning process can be done by hand. Alternatively, the user can rotate the settling tank 102 into the second position so the contents of the settling tank 102 fall out of the tank 102 by gravity. Also, when in the second position, the inside of the settling tank 102 can be cleaned by using a high pressure water jet (power washer). In some embodiments, when washed out when in the second position, the contents of the settling tank 102, and any water used to clean the settling tank, fall onto the screen 106 and are filtered and discharged accordingly.

Figure 5:
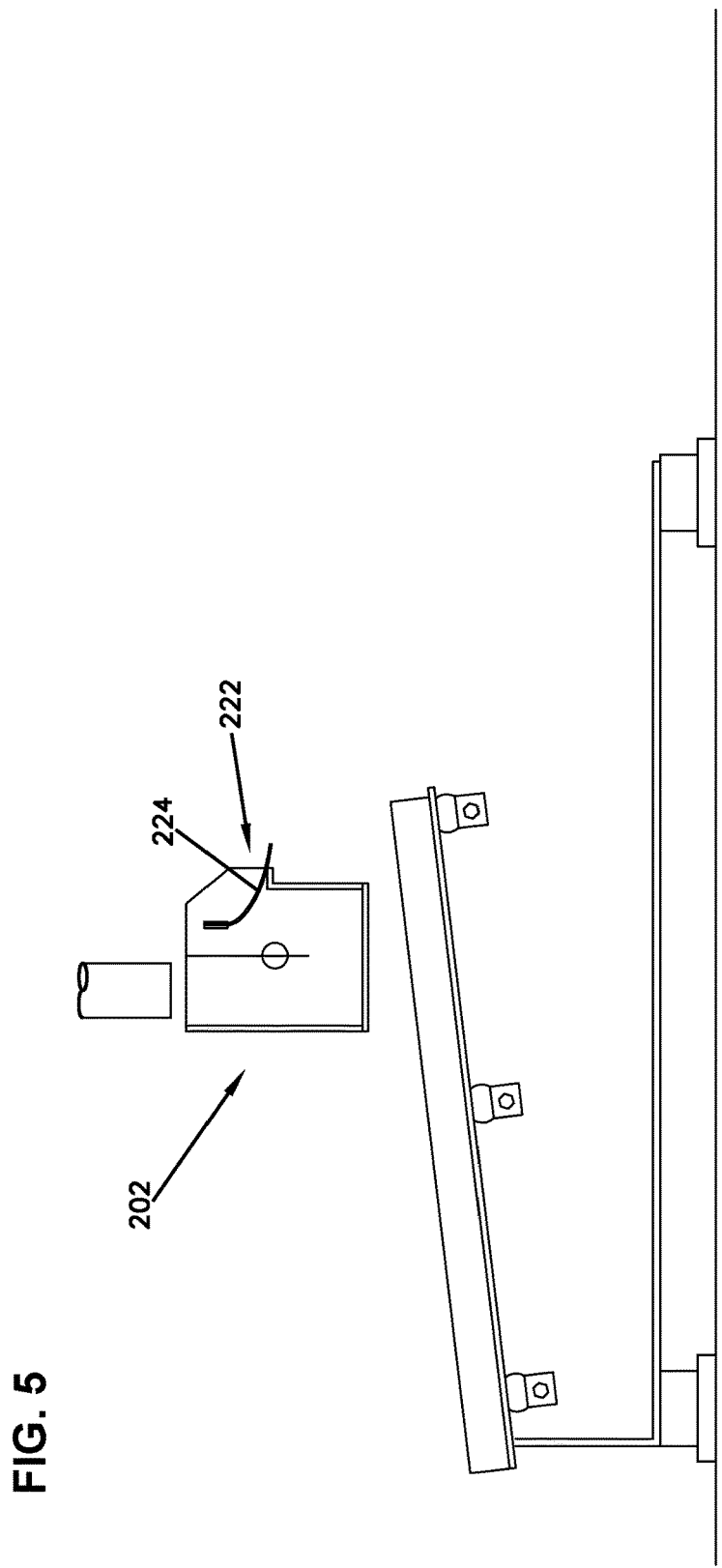
FIG. 5 is a schematic view of an example drilling fluid processing system, according to one embodiment of the present disclosure.

FIG. 5 is a side view of a settling tank 202 according to one embodiment of the present disclosure. In the depicted embodiment, the flow regulator 224 is shown to be comprised of a flexible material, such as rubber or another elastomeric material. Similar to the rigid flow regulator 124 shown in FIGS. 1-4, the flow regular 224 helps deflect the fluid flow downward rather than having it splash out of the used fluid outlet 222. The flow regulator 224 can be fixed adjacent the used fluid outlet 222. In some embodiments, the flow regulator 224 can be configured to behave like a movable flapper valve. In some embodiments, the flow regulator 224, in addition to being made of a flexible material, may be hingedly attached (not shown) to the settling tank 202.

Like the settling tank 102 in FIGS. 1-4, the settling tank 202 is also rotatable between first and second positions, where, when in the first position, the settling tank 202 is configured to receive used drilling fluid via the used fluid inlet 220 and expel used fluid via the used fluid outlet 222. When in the second position, the settling tank 202 can be configured to expel its contents from the used fluid inlet 220.

Figure 6:
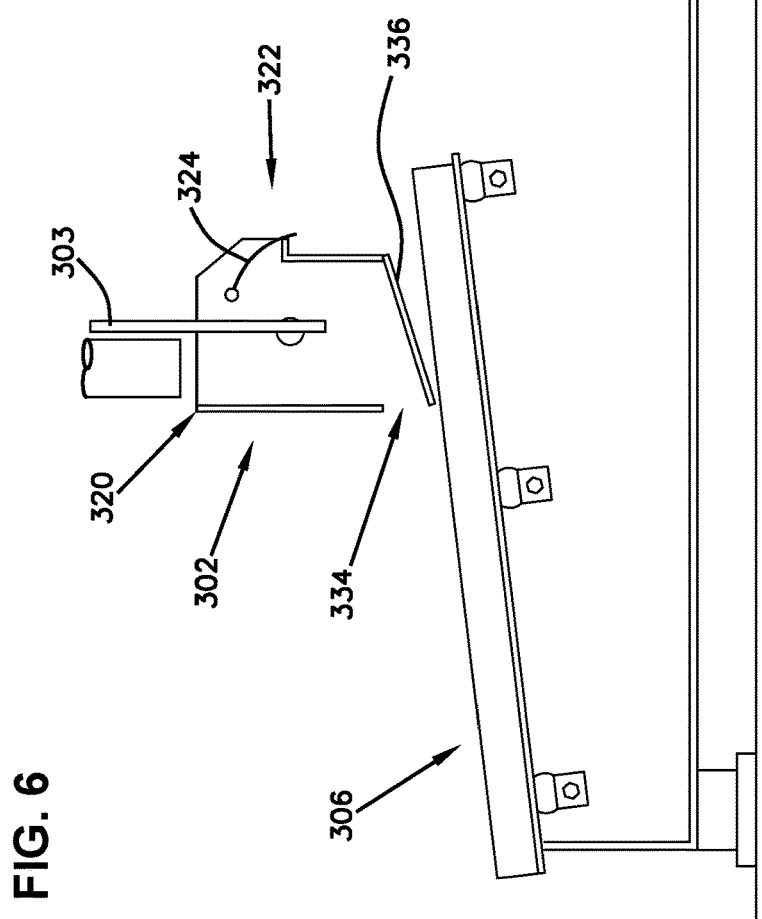
FIG. 6 is a schematic view of an example drilling fluid processing system, according to one embodiment of the present disclosure.

FIG. 6 is a side view of a settling tank 302 according to one embodiment of the present disclosure. The settling tank 302 has similar features to the settling tanks depicted in FIGS. 1-5. Accordingly, the settling tank 302 includes a used fluid inlet 320 and a used fluid out 322. Also, in some embodiments, the settling tank 302 is rotatable between first and second positions. The settling tank 302 also includes a handle 303 attached thereto to facilitate rotating. However, the settling tank 302 also includes an open bottom 334. The bottom 334 includes a hinged cover 336 configured to be positioned in an open position and a closed position. In the open position, the contents of the settling tank 302 can be emptied through the open bottom 334 onto the screen 306. The screen 306 can be similar or identical to the screen 106 disclosed above. In the closed position, the cover 336 retains the contents of the settling tank 302 within the settling tank 302. In some embodiments, the cover 336 is lockable in the first or second position. In other embodiments, the cover can be configured so that when in the open position it does not rest on the screen 306. In some embodiments, this is accomplished by a hinged arm. In other embodiments, this is accomplished by a tether.

Figure 7:
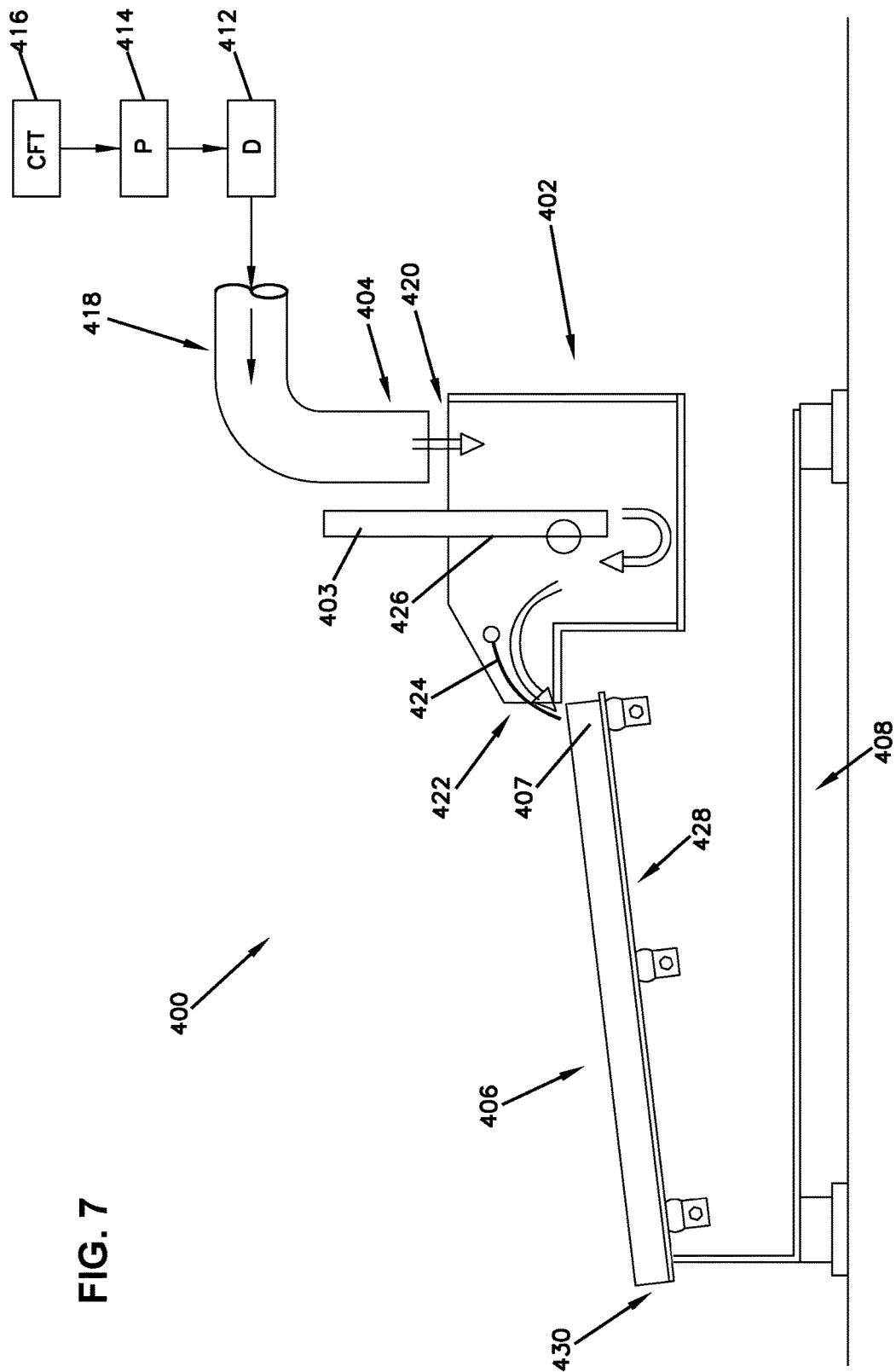
FIG. 7 is a schematic view of an example drilling system and drilling fluid processing system, according to one embodiment of the present disclosure.

FIG. 7 is a schematic of a drilling fluid processing system 400 according to one embodiment of the present disclosure. The drilling fluid processing system 400 is similar to the drilling fluid processing system 100 in structure as shown in FIG. 1 outlined above; however, the drilling fluid processing system 400 differs in the arrangement of such structure. The drilling fluid processing system 400 includes a settling tank 402, a used fluid port 404, a screen 406, and a bed 408. The drilling fluid processing system 400 is configured to receive used drilling fluid from the drilling arrangement 412. The drilling arrangement 412 initially receives clean drilling fluid from a pump 414, which pumps clean drilling fluid from a clean fluid tank 416, and generates the used drilling fluid from the clean drilling fluid during the standard course of the drilling process.

The settling tank 402 is positioned adjacent the screen 406. The settling tank 402 is configured to receive used drilling fluid from the used fluid port 404 at a used fluid inlet 420. The used fluid inlet 420 defines an open top. The used drilling fluid within the settling tank 402 and then flows around an internal divider 426 and out of a used fluid outlet 422. At the used fluid outlet 422, a flow regulator 424 is configured to regulate flow out of the used fluid outlet 422 by using a hingedly mounted rigid plate. In some embodiments, the flow regulator 424 can be configured to behave like a movable flapper valve. The used fluid falls from the used fluid outlet 422 by gravity onto the screen 406 at the screen's highest point 407. In some embodiments, at least a portion of the settling tank 402 can be vertically positioned over the screen 406. In still other embodiments, the used fluid outlet can be an exit weir that is vertically positioned over the screen 406.

Once on the screen 406, the used drilling fluid moves over the screen 406, the screen 406 proceeding to filter solids and particulates from the used drilling fluid. The screen 406 has a first outlet 428 defined along the length of the screen 406 and a second outlet 430 that is defined at the opposite end of the screen 406 from where the used fluid is first deposited 407. The first outlet 428 can be configured to allow only fluid to pass through.

Figure 8:
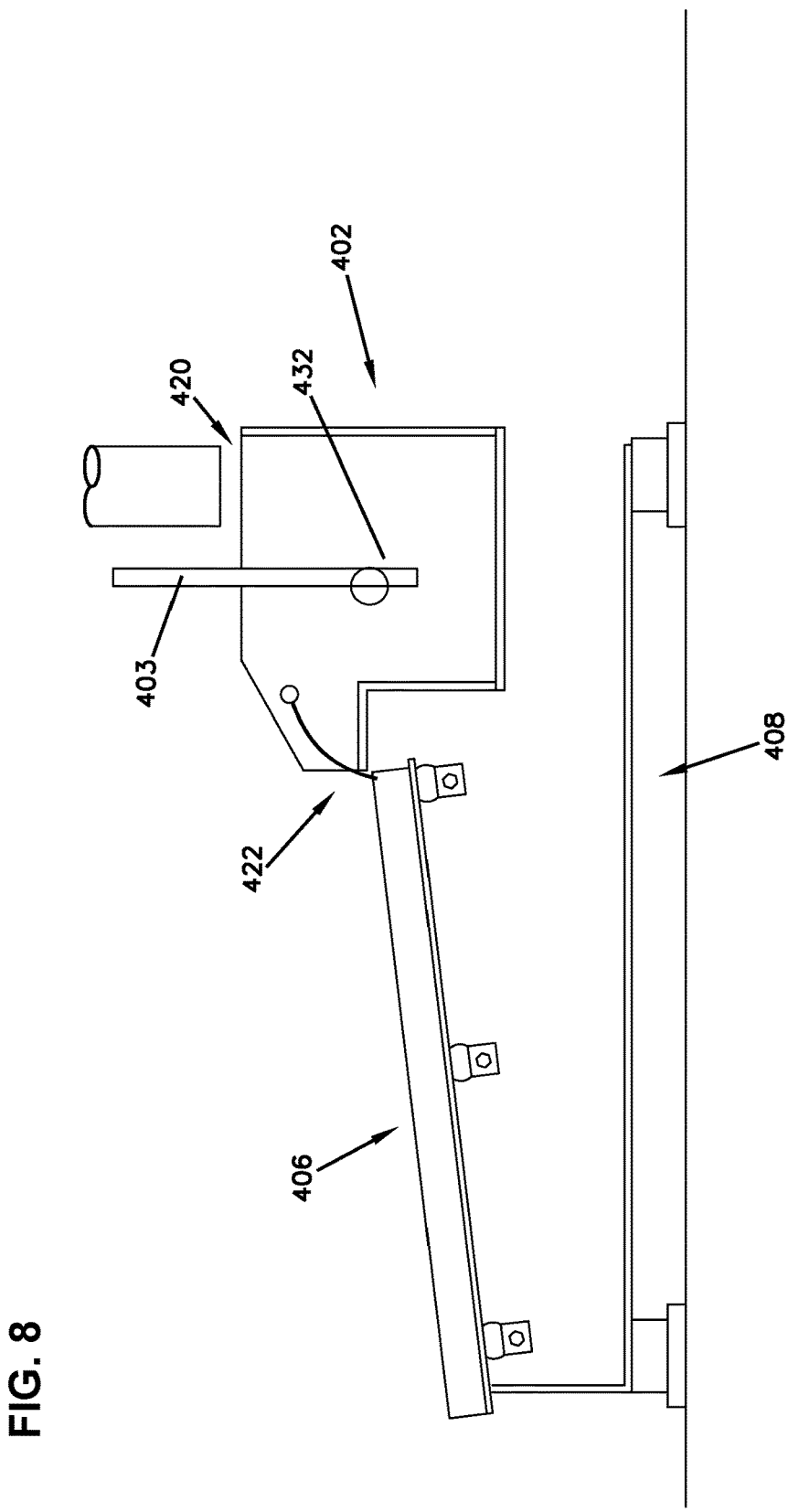
FIG. 8 is a schematic view of the example drilling system and the drilling fluid processing system of FIG. 7 with a settling tank in a first position.
Figure 9:
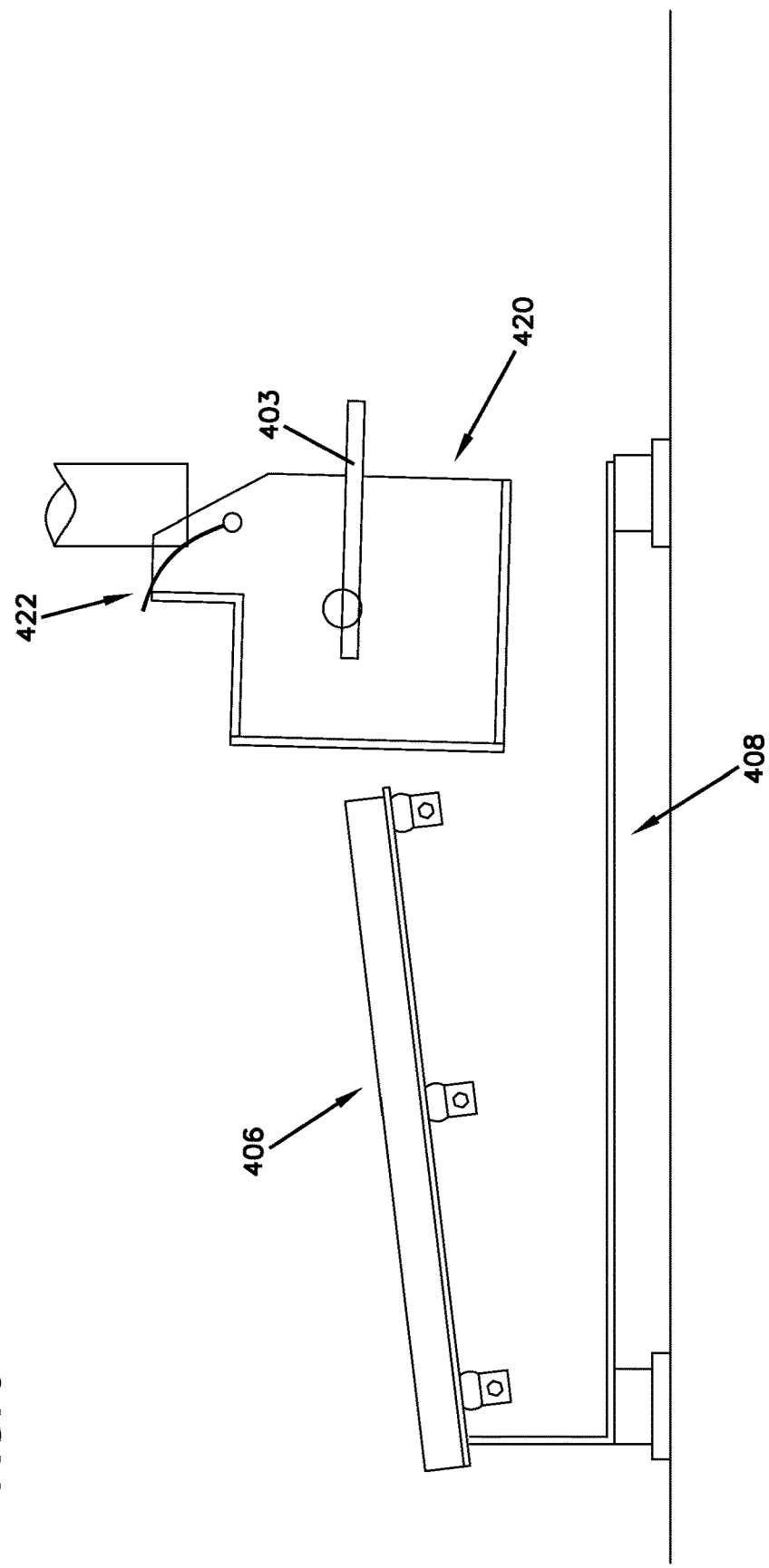
FIG. 9 is a schematic view of the example drilling system and the drilling fluid processing system of FIG. 7 with the settling tank in a second position.

FIGS. 8 and 9 show the settling tank 402 in a first position and a second position respectfully. Like the settling tank 102, 202, and 302, settling tank 402 can be rotatable so that the contents of which can be emptied. The settling tank 402 also includes a handle 403 attached thereto to facilitate rotating. In the first position, the settling tank 402 is configured so as to receive used drilling fluid at the settling tank's used fluid inlet 420 and then expel the fluid at the used fluid outlet 422. In the second position, as shown in FIG. 9, the settling tank 402 is configured to expel its contents via the used fluid inlet 420. The second position can be used for maintenance or cleaning.

The settling tank 402 can be rotatable about a pivot point 432. In some embodiments, the settling tank 402 can be mounted to a frame via a pivotable mount that connects the frame and the settling tank 402. In still other embodiments, the settling tank 402 can include a handle attached thereto to facilitate rotating. In still other embodiments, the settling tank 402 can be configured so as to be lockable in either the first or second position. In the depicted embodiment, the settling tank 402 is rotatable in a direction so that the contents of the settling tank are expelled away from the screen 406 and the bed 408.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A drilling fluid reclamation unit comprising:
   a filtering screen; and
   a settling tank pivotally mounted proximate to the filtering screen, the settling tank including a used fluid inlet defining an open top and a used fluid outlet, the used fluid outlet being positioned at a side surface of the settling tank;
   wherein the settling tank is pivotable between a first position and a second position, wherein when in the first position, the settling tank is configured to receive a fluid at the used fluid inlet and expel the fluid via the used fluid outlet and onto the filtering screen, and wherein when in the second position, the settling tank is configured to empty the contents of the settling tank via the used fluid inlet.

2. The drilling fluid reclamation unit of claim 1, further comprising a flow regulator hingedly mounted at the settling tank used fluid outlet, wherein the flow regulator is configured to regulate fluid flow passing through the used fluid outlet.

3. The drilling fluid reclamation unit of claim 2, wherein the flow regulator is comprised of a flexible material.

4. The drilling fluid reclamation unit of claim 1, wherein the used fluid outlet is an exit weir, the exit weir being configured and arranged to promote a flow of fluid out of the settling tank when the settling tank is in the first position.

5. The drilling fluid reclamation unit of claim 1, further comprising a second used fluid outlet being positioned at the bottom surface of the settling tank, the second used fluid outlet having a hinged cover configured to facilitate opening and closing of the second used fluid outlet.

6. The drilling fluid reclamation unit of claim 1, wherein the settling tank also includes an internal divider, the internal divider being configured to alter fluid flow within the settling tank between the used fluid inlet and the used fluid outlet.

7. The drilling fluid reclamation unit of claim 1, wherein the settling tank is configured to empty the contents of the settling tank onto the filtering screen when in the second position.

8. The drilling fluid reclamation unit of claim 1, wherein the filtering screen is sloped to promote movement of debris in a general first direction, and wherein the used fluid outlet of the settling tank faces in a second direction, the second direction being opposite of the first direction.

9. The drilling fluid reclamation unit of claim 1, wherein the used fluid outlet of the settling tank deposits fluid at a first end of the filtering screen, and wherein a second end of the filtering screen is positioned above the first end so that the filtering screen is sloped to slow the movement of fluid across the filtering screen.

* * * * *